No. 761,025. PATENTED MAY 24, 1904.
J. W. AREGOOD.
BRICK DRIER.
APPLICATION FILED OCT. 17, 1903.
NO MODEL. 3 SHEETS—SHEET 1.
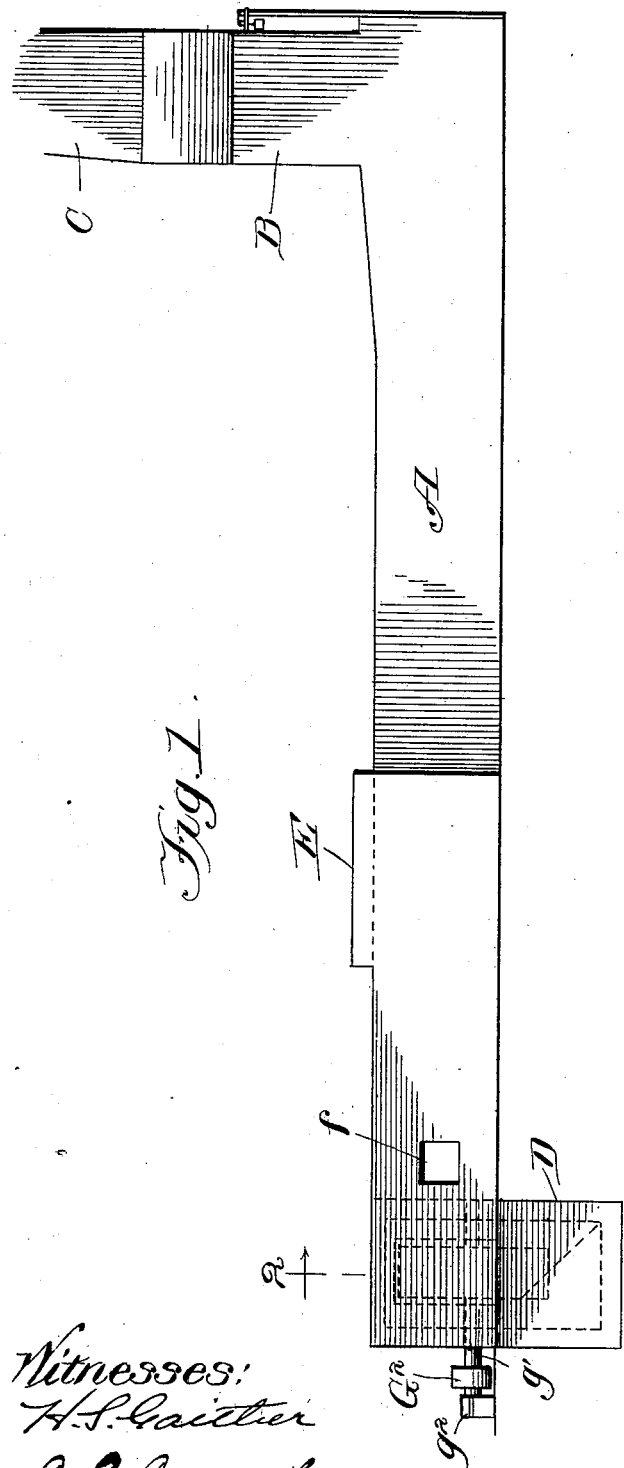
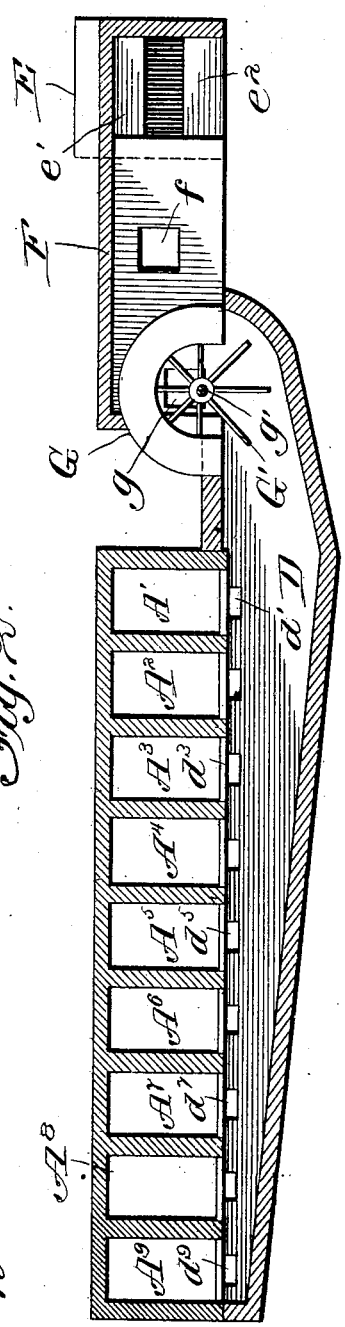

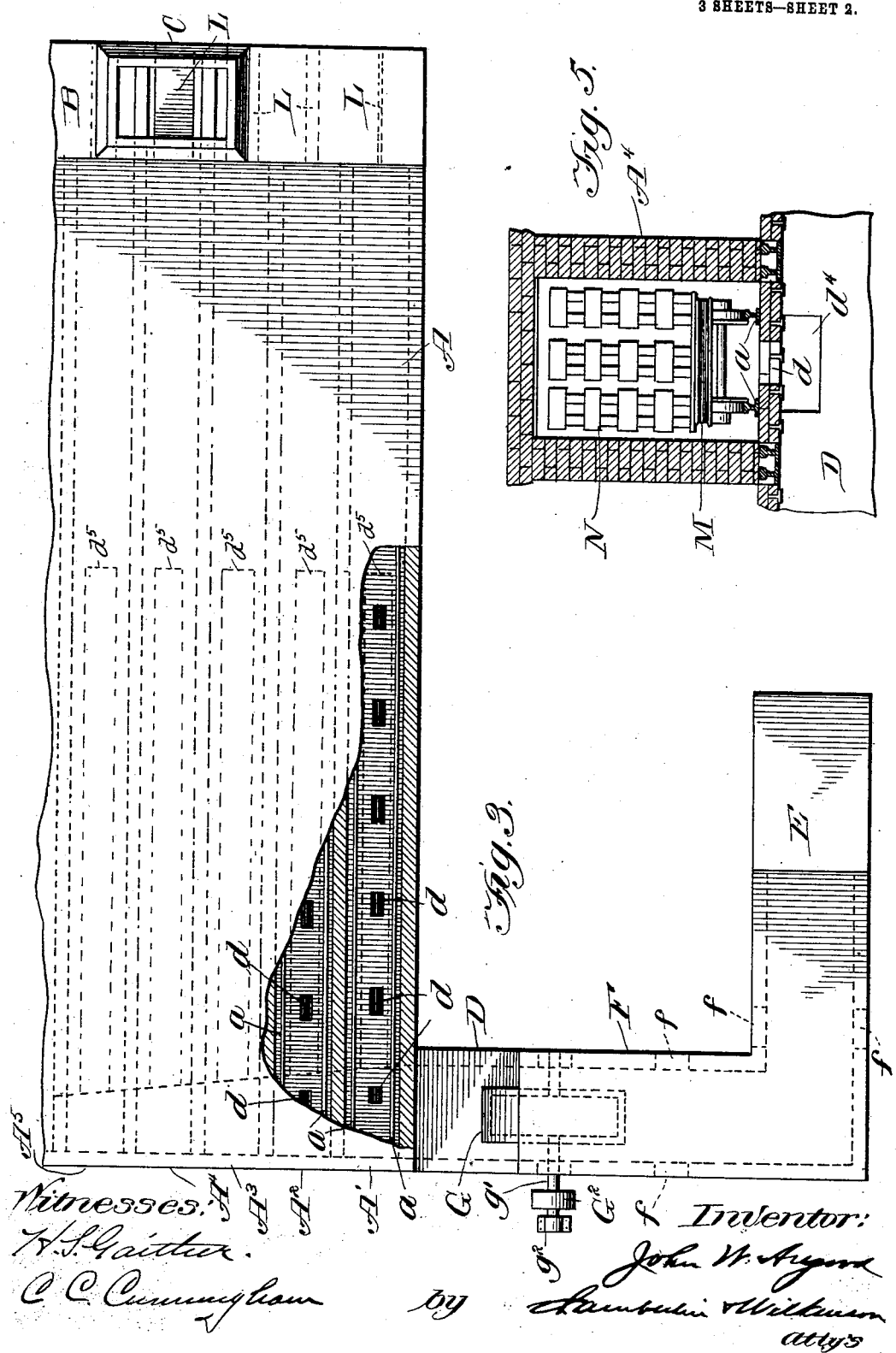

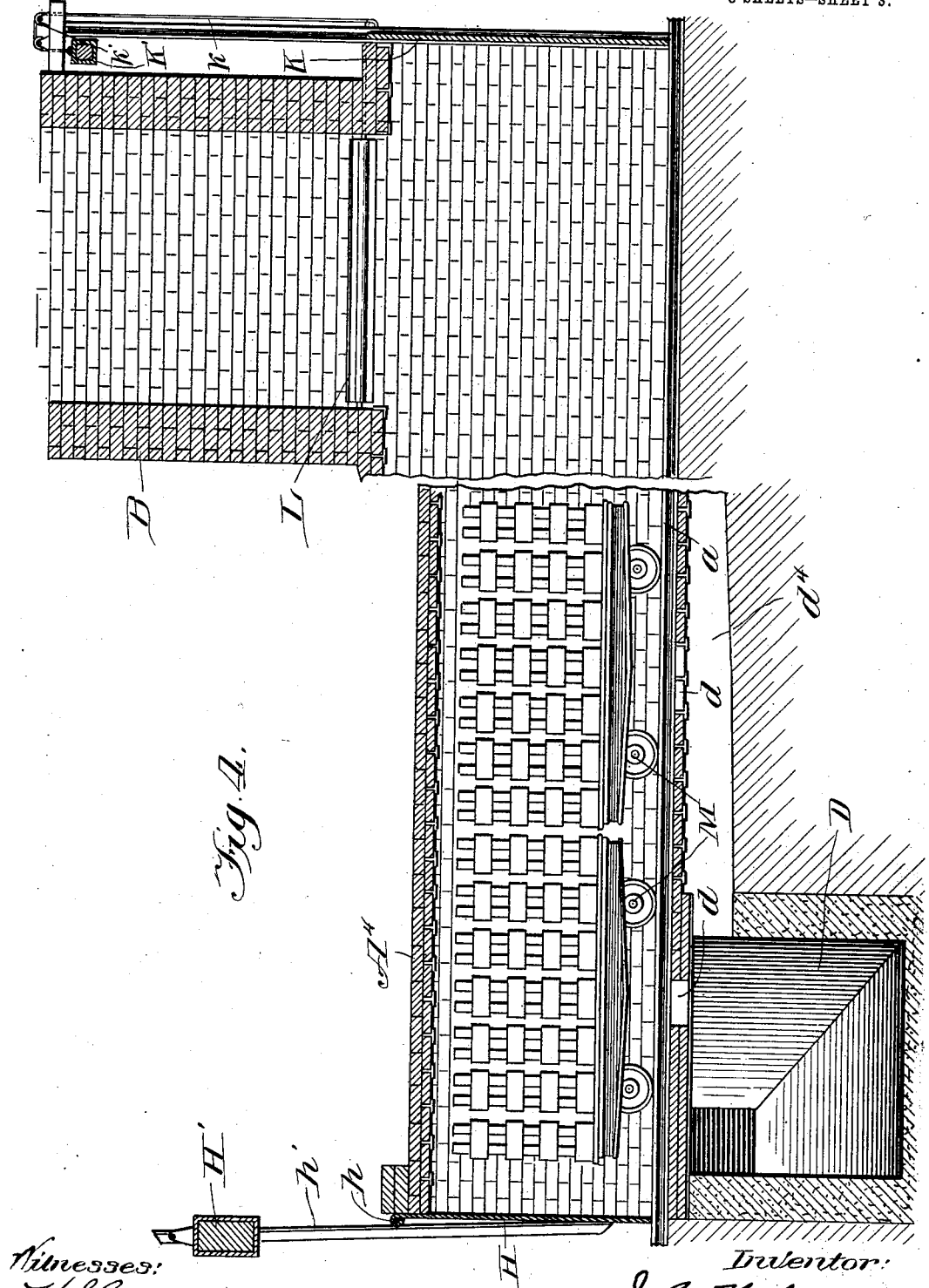

No. 761,025.

Patented May 24, 1904.

UNITED STATES PATENT OFFICE.

JOHN W. AREGOOD, OF CHICAGO, ILLINOIS, ASSIGNOR OF ONE-HALF TO PATRICK J. SEXTON, OF CHICAGO, ILLINOIS.

BRICK-DRIER.

SPECIFICATION forming part of Letters Patent No. 761,025, dated May 24, 1904.

Application filed October 17, 1903. Serial No. 177,450. (No model.)

*To all whom it may concern:*

Be it known that I, JOHN W. AREGOOD, a citizen of the United States, residing at Chicago, county of Cook, State of Illinois, have invented a certain new and useful Improvement in Brick-Driers; and I declare the following to be a full, clear, and exact description of the invention, such as will enable others skilled in the art to which it pertains to make and use the same, reference being had to the accompanying drawings, which form a part of this specification.

My invention relates in general to apparatus employed in brick-making, and more particularly to apparatus in which the moisture is evaporated from green bricks preparatory to baking them in the kilns, such apparatus being commonly known as a "drier."

In the use of brick-driers the green bricks delivered from the molds are piled upon cars, which are run on tracks into the drier. It is desirable that the temperature should be uniform throughout the drier in order that the bricks in all parts thereof may be subjected to the same degree of temperature, thereby gradually and evenly evaporating the moisture from the bricks in all portions of the drier at a minimum consumption of fuel.

The primary object of my invention is to produce an apparatus of the class referred to in which the hot air delivered from the furnace to the drier is so distributed as to circulate through every part thereof, thereby subjecting the bricks uniformly to the desired degree of temperature and also more fully utilize the heat than heretofore possible.

My invention will be more fully described hereinafter with reference to the accompanying drawings, in which the same is illustrated as embodied in a convenient and practical form, and in which—

Figure 1 is a view in elevation of my invention; Fig. 2, a sectional view on line 2 2, Fig. 1; Fig. 3, a plan view; Fig. 4, an enlarged central sectional view, portions being broken away; and Fig. 5, a fragmentary sectional view, on an enlarged scale, through a portion of the flue and the adjacent end of one of the tunnels.

The same reference characters are used to designate the same parts in the several figures of the drawings.

Reference-letter A designates the drier in general, which comprises a plurality of parallel tunnels $A'$ $A^2$ $A^3$, &c. Corresponding ends of the tunnels are united by a transverse flue B, extending across the tops thereof, above which is surmounted the chimney C. The rear end of each tunnel is provided with a door, preferably mounted to slide vertically, as clearly shown in Fig. 4, in which K designates the door; $k$, flexible connections united to the upper end of the door and passing over pulleys $k'$, suitably supported at the rear of the transverse flue B, and $K'$ a counterbalance-weight united to the ends of the flexible connections $k$. The front end of each tunnel is also provided with a door, preferably mounted to swing outwardly, as clearly shown in Fig. 4, in which H is the door, pivotally secured at $h$ to the top of the tunnel and provided with upwardly-projecting supports $h'$, at the upper ends of which is secured a counterbalance-weight $H'$. Located beneath the rear ends of the tunnels is a flue D, preferably of tapered cross-section. Communicating with the flue D and extending beneath the tunnels $A'$ $A^2$, &c., are passages $d'$ $d^2$ $d^3$, &c., of gradually-decreasing cross-section. Passage-ways $d$ extend through the floors of the several tunnels, thereby placing the flue D and passage-ways connected therewith in communication with the interior of the several tunnels.

E designates a furnace of any suitable construction, which is shown in Fig. 2 as being provided with transverse bridge-walls $e'$ and $e^2$. Interposed between the furnace E and the flue D is a passage F, which is shown in Fig. 3 as angular in construction. Located at the end of the passage F and immediately above the end of the flue D is a blower G for drawing the hot air and products of combustion from the furnace and forcing the same into the flue. Such blower comprises a fan $G'$, mounted upon a shaft $g'$, the latter being journaled in suitable bearings $g^2$. The shaft $g'$ may be rotated by any suitable means— such, for instance, as a belt-pulley $G^2$, fixed thereto. The passage F is provided with openings $f$ through its side walls and also openings $g$ through the side walls at either side of the blower, through which air is drawn by the operation of the fan.

It has been found in practice that the tunnels farthest away from the furnace would receive the greatest quantity of hot air were the flue D of uniform cross-section, and hence in order that the various tunnels may receive the same quantity of hot air the bottom wall of the flue D gradually inclines upwardly and the side walls thereof incline toward each other, thereby diminishing the cross-section of the flue, so as to restrict the passage-way through which the products of combustion pass to the tunnels located farthest away from the furnace. In order that the draft through the chimney may be equally divided between the various tunnels, dampers L are provided to control the communication between the individual tunnels and the transverse flue B, extending above the same. By adjusting such dampers the communication between the chimney and the tunnels may be so controlled as to create an equal draft in all of the tunnels, thereby uniformly distributing the hot air and products of combustion throughout the several tunnels.

In the operation of my invention cars M are loaded with green bricks received from the molds and rolled upon tracks $a$ through the doors K into the tunnels. After the bricks have been sufficiently dried the cars are rolled out of the tunnels through the front doors H.

It will be noticed that the passages $d'$ $d^2$ $d^3$, &c., extending beneath the several tunnels, terminate a distance from the chimney C and that such passages gradually decrease in cross-section. The too rapid drying of the green bricks when first rolled into the drier is avoided, as the cars containing the same occupy the portions of the tunnels beneath which the passages do not extend, and as the bricks are gradually dried and are rolled farther into the tunnels they are gradually subjected to more heat by occupying positions above the gradually-increasing passage-ways beneath the tunnels. The green bricks when first introduced in the oven are consequently prevented from cracking and are gradually submitted to more intense heat as they become drier.

From the foregoing description it is evident that I have produced a drier comprising a plurality of tunnels through which the heat is uniformly distributed by means of the tapering cross-section of the flue and the adjustment of the dampers controlling the communication between the tunnels and the chimney, thereby avoiding heating portions of the drier too hot while other portions are insufficiently supplied with heat, and consequently fully utilizing the heat generated and minimizing the consumption of fuel.

Having now fully described my invention, what I claim as new, and desire to secure by Letters Patent, is—

1. In a brick-drier, the combination with a plurality of parallel tunnels, of a flue extending transversely beneath and freely communicating with the corresponding ends of said tunnels through unobstructed openings, said flue having a gradually-decreasing cross-section, passages of gradually-decreasing cross-section communicating with said flue and extending predetermined distances beneath said tunnels, said passages being in free communication through unobstructed openings with the portions of the tunnels above the same, and a furnace communicating with said flue.

2. In a brick-drier, the combination with a plurality of tunnels, of a flue extending transversely beneath and communicating with the corresponding ends of said tunnels through unobstructed openings, the portions of said flue which communicate with the successive tunnels being progressively smaller in cross-section, a chimney mounted above and communicating with the ends of said tunnels opposite to said flue, passages of gradually-decreasing cross-section communicating with said flue and extending predetermined distances beneath said tunnels, said passages being in free communication through unobstructed openings with the portions of the tunnels above the same, and a furnace communicating with said flue.

3. In a brick-drier, the combination with a plurality of tunnels, of a flue extending transversely beneath and communicating with the corresponding ends of said tunnels through unobstructed openings, the portions of said flue which communicate with the successive tunnels being progressively smaller in cross-section, a chimney communicating with the ends of said tunnels opposite to said flue, passages communicating with said flue and extending part way beneath said tunnels, said passages being in free communication through unobstructed openings with the portions of the tunnels above the same, and a furnace communicating with said flue.

In testimony whereof I sign this specification in the presence of two witnesses.

JOHN W. AREGOOD.

Witnesses:
  GEO. L. WILKINSON,
  C. C. CUNNINGHAM.